(12) United States Patent
Pike et al.

(10) Patent No.: US 7,036,374 B2
(45) Date of Patent: May 2, 2006

(54) MICRO-MACHINED SUSPENSION PLATE WITH INTEGRAL PROOF MASS FOR USE IN A SEISMOMETER OR OTHER DEVICE

(76) Inventors: William Thomas Pike, 40 Wellesley Road, London (GB) W4 4BZ; Ian Standley, 2440 Bradley Ave., Claremont, CA (US) 91711; Richard Syms, 59 Woodstock Avenue, Ealing, London (GB) WB 949

(*) Notice: Subject to any disclaimer, the term of this patent is extended or adjusted under 35 U.S.C. 154(b) by 0 days.

(21) Appl. No.: 10/851,029

(22) Filed: May 21, 2004

(65) Prior Publication Data

US 2005/0097959 A1    May 12, 2005

Related U.S. Application Data

(63) Continuation-in-part of application No. 10/058,210, filed on Jan. 25, 2002, now Pat. No. 6,776,042.

(51) Int. Cl.
*G01P 15/125* (2006.01)
*G01H 11/00* (2006.01)

(52) U.S. Cl. ............................... 73/514.32; 73/514.17; 73/649

(58) Field of Classification Search ............ 73/514.32, 73/514.17, 514.18, 514.38, 649, 514.16, 73/514.29, 514.12, 514.13
See application file for complete search history.

(56) References Cited

U.S. PATENT DOCUMENTS

| | | | |
|---|---|---|---|
| 4,280,206 A | 7/1981 | Guralp | |
| 4,586,260 A | 5/1986 | Baxter et al. | |
| 4,879,508 A | 11/1989 | Andermo | |
| 5,153,494 A | 10/1992 | Hollis | |
| 5,447,068 A | 9/1995 | Tang | |
| 5,524,488 A | 6/1996 | Foote | |
| 5,569,852 A | 10/1996 | Marek et al. | |
| 5,834,864 A | 11/1998 | Hesterman et al. | |
| 5,864,062 A | 1/1999 | Nagahara et al. | |
| 5,864,063 A | 1/1999 | Otani et al. | |
| 6,029,517 A | 2/2000 | Brun et al. | |
| 6,073,490 A | 6/2000 | Konovalov et al. | |
| 6,105,427 A | 8/2000 | Stewart et al. | |
| 6,196,067 B1 | 3/2001 | Martin et al. | |
| 6,294,400 B1 | 9/2001 | Stewart et al. | |
| 6,308,569 B1 | 10/2001 | Stewart | |
| 6,481,286 B1 | 11/2002 | Bernstein et al. | |
| 6,776,042 B1 * | 8/2004 | Pike et al. | ............... 73/514.32 |

OTHER PUBLICATIONS

Herndon, J.N., et al., Manipulation Hardware for Microgravity Research, Proceedings, 38th Conference on Remote Systems Technology, 1990, pp. 161-168, vol. 2.

(Continued)

*Primary Examiner*—Helen Kwok
(74) *Attorney, Agent, or Firm*—Trojan Law Offices

(57) ABSTRACT

An accelerometer or a seismometer using an in-plane suspension geometry having a suspension plate and at least one fixed capacitive plate. The suspension plate is formed from a single piece and includes an external frame, a pair of flexural elements, and an integrated proof mass between the flexures. The flexural elements allow the proof mass to move in the sensitive direction in the plane of suspension while restricting movement in all off-axis directions. Off-axis motion of the proof mass is minimized by the use of intermediate frames disbursed within and between the flexural elements. Intermediate frames can include motion stops to prevent further relative motion during overload conditions. The device can also include a dampening structure, such as a spring or gas structure that includes a trapezoidal piston and corresponding cylinder, to provide damping during non-powered states.

34 Claims, 7 Drawing Sheets

OTHER PUBLICATIONS

Martin, H. Lee, Dr., et al., Control Distribution for Electrically Modular Manipulator Systems, Robotics and Remote Systems Conference, ANS,1989, pp. 1-6.

Glassell, R.L., et al., Custom Electronic Subsystems for the Laboratory Telerobotic Manipulator, Nat. Aeronautics and Space Admin., Langley Research Ctr., 1991, pp. 151-159.

* cited by examiner

MICRO-MACHINED SUSPENSION PLATE WITH INTEGRAL PROOF MASS FOR USE IN A SEISMOMETER OR OTHER DEVICE

INCORPORATION BY REFERENCE

This Application specifically incorporates by reference the subject matter and complete text and is a continuation-in-part of related patent application Ser. No. 10/058,210 entitled MICRO-MACHINED ACCELEROMETER" and filed on Jan. 25, 2002, now U.S. Pat. No. 6,776,042 as if set forth fully hereinafter.

FIELD OF THE INVENTION

The invention relates to seismic instrumentation in general. More particularly, the invention is related to an improved micro-machined suspension plate having an integral proof mass and a method of fabrication for the same that may be utilized in a seismometer (velocimeter), an accelerometer, or other similar device.

DESCRIPTION OF THE PRIOR ART

U.S. patent application Ser. No. 10/058,210 entitled "MICRO-MACHINED ACCELEROMETER", was filed on Jan. 5, 2002 and discloses a novel construction of an accelerometer or seismometer using an in-plane suspension geometry having a suspension plate and at least one fixed capacitive plate. In contrast to conventional seismometers, which utilize a spring supporting a distinct proof mass on an external frame, the micro-machined suspension plate is formed from a single piece of material to include the external frame, a pair of flexural elements and an integral proof mass interposed between the flexures. The flexural elements allow the proof mass to move in one direction, the sensitive direction, in the plane of suspension, while restricting as far as possible movement in all the other off-axis directions.

The new in-plane design also includes a displacement transducer for determining relative motion of the proof mass. This transducer includes accurately placed drive electrodes, preferably positioned on the proof mass, and corresponding pickup electrodes located on the fixed capacitive plate.

A preferred embodiment of this design for a low-noise seismometer allows for the production of a system having a resonance frequency of approximately 10 Hz. However, in order to utilize such a design over a bandwidth of approximately 100 Hz, is it desirable to ensure that spurious oscillation frequencies, in both the sensitive direction, and in the off-axis directions (namely the orthogonal in-plane direction, and the orthogonal out-of-plane directions) are suppressed by the feedback system or do not exist in the system. Otherwise, they will interfere with accurate operation of the system over the full bandwidth. These considerations apply equally to other types of velocity and acceleration sensors, with generally a large desired margin between the top of the sensor bandwidth and the first spurious resonance, in any direction.

There are known techniques for rejecting any signals or oscillations of the proof mass for spurious modes in the off-axis directions. Unfortunately, many of these known techniques effect the geometry, placement and positioning of the drive and pick-up electrodes. Moreover, while these techniques can allow for stable operation, they may still result in undesirable artifacts in the amplitude and phase response of the system. Accordingly, an alternate approach is needed in order to ensure that other resonances do not exist within the desired bandwidth.

Additionally, the plane structure disclosed in U.S. patent application Ser. No. 10/058,210 requires that the gap between the drive and pickup electrodes must be carefully controlled. This implies that the out-of-plane motion of the proof mass is suppressed as far as possible.

For accelerations equally impressed along the sensitive axis and an off-axis, the off-axis displacement is related to the sensitive-axis displacement by the square of the ratio of the fundamental frequency to the lowest frequency of any off-axis modes. Accordingly, it is desirable to keep the ratio of these two frequencies as low as possible to minimize the undesirable displacement in the off-axis direction.

Additionally, the in-plane structure described in U.S. patent application Ser. No. 10/058,210 may be fractured or damaged due to extreme external shock or vibration. This problem occurs most often when the device is not powered and the feedback electronics are not active, in which case there is no active damping of the system. This might occur, for example, during the packaging and transport of such a device, or in the fabrication processing after the spring mass geometry has been completed. Although the use of a gas-filled cavity may provide some damping effects, this alone may not be sufficient to minimize the effects of such external shock or vibration. Accordingly, it is desirable to have a non-powered dampening system that minimizes the effects of shock to the system that may occur when the system is in a non-powered/non-operational state.

SUMMARY OF THE INVENTION

In the present invention, the off-axis motion of the proof mass is minimized through the use of intermediate frames. Accordingly, the present invention improves upon the design set forth in U.S. patent application Ser. No. 10/058,210 by utilizing intermediate frames disbursed within and between the flexural elements in order to produce a system where the frequency of the off-axis modes are as many multiples as possible of the resonant frequency of the system, while minimizing the reduction in the frequencies of spurious modes along the sensitive axis. This eliminates any spurious modes over a much larger bandwidth allowing the production of a device with a flat response over such bandwidth. The solution is easy to implement in the preferred embodiment of the suspension, without any effect on or additional complications to the design of the electronics used in the system. As a result of the increased out-of-plane rigidity, these frames minimize variation in the transducer gap between the fixed and proof-mass electrodes.

The number of frames to be used is determined as a function of both the desired bandwidth over which spurious modes are to be eliminated and the desired operational parameters of the system. More particularly, as the number of frames is increased, the off-axis spurious resonant modes are pushed up in frequency, thus increasing the overall effective bandwidth over which the device may operate without the occurrence of any spurious resonant frequencies. However, as the number of frames is increased, the frequency of spurious modes along the sensitive axis is reduced, due to the additional mass of the frames. Accordingly, a balance is struck between the desired elimination of off-axis and on-axis spurious resonant frequencies over an operational.

The intermediate frames can be provided with motion stops, so that under overload conditions the frames engage each other, preventing further relative motion, before the flexures make any contact or become overstressed. These stops thus minimize the chance of fracture or the irreversible surface bonding of portions of the flexure ("stiction").

The invention also preferably includes a dampening structure that is highly effective during non-powered/non-operational states (i.e. when the feedback control system is not powered and does not provide any dampening). Preferably, this dampening structure includes a spring/gas dampening structure configured to provide damping during non-powered states.

In a preferred embodiment, the structure preferably includes a trapezoidal shaped piston and a corresponding engagement cylinder. The damping structure is positioned to engage between the outermost intermediate frame and the external frame as the springs are overloaded. In this way, and as explained earlier, the piston or cylinder is placed at a traversal distance which extends further than any intermediate flexural elements such that it will not make contact with any of these flexural elements. The piston or cylinder faces outward, and a corresponding cylinder or piston is then positioned on the inner surface of the outer frame of the suspension plate, facing inward toward the proof mass.

As the most outward intermediate frame approaches the inner surface of the outer frame of the suspension plate, the piston will engage the cylinder, thereby providing a dampening effect before the intermediate frame can contact the surface of the external frame of the suspension. In a preferred embodiment where the suspension plate is contained and submersed within a gaseous environment, the pressure of the gas will increase within the confined space of the cylinder as the piston moves further into the cylinder. The resulting viscous gas flow will act as a damping force, slowing the outer intermediate frame away from the external frame of the suspension. In an alternative embodiment where no gas is used, the piston and cylinder may be coupled using a dissipative material disposed between the piston and the cylinder such that the material is compressed as the piston moves further into the cylinder, thereby providing a damping force which slows the motion of the outer intermediate frame toward the external frame.

DETAILED DESCRIPTION OF THE PREFERRED EMBODIMENTS

As explained earlier, U.S. patent application Ser. No. 10/058,210 entitled "MICRO-MACINED ACCELEROMETER" discloses an improved micro-machined suspension plate which may be utilized in an accelerometer, seismometer (velocimeter) and/or other similar device.

Figure 1:
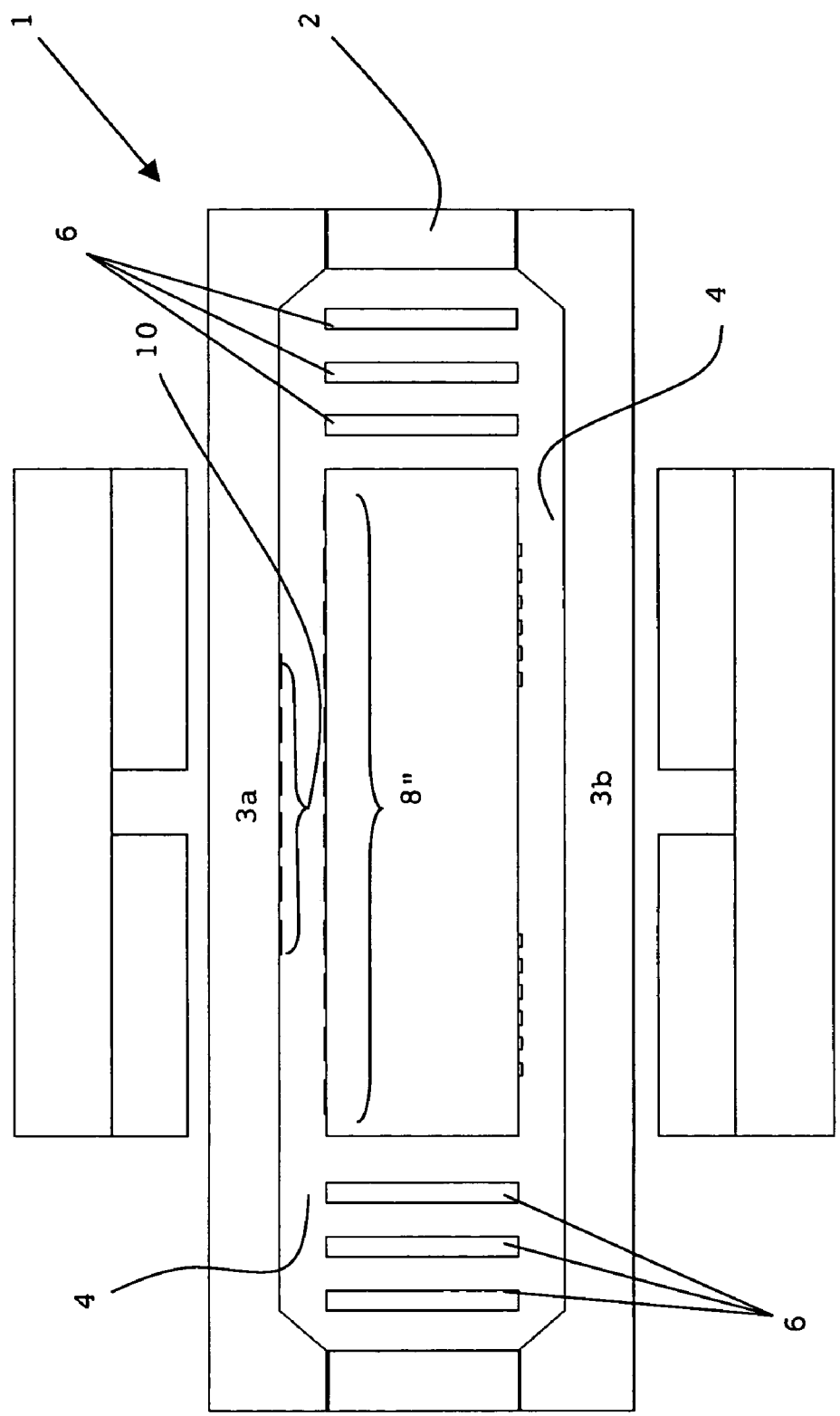
FIG. 1 illustrates a cross-sectional diagram of a seismometer having a suspension plate and two capacitive plates, with a centrally located proof mass supported by flexural elements on each side utilized in a known, prior-art micro-machined in-plane suspension geometry.

The suspension plate is formed of and includes a revolutionary, in-plane suspension geometry rather than a traditional—spring design. More particularly, the suspension plate is micro-machined to form a central proof mass and flexural elements located on opposite sides of the proof mass. FIG. 1 illustrates a cross-sectional diagram of a seismometer 1 having a suspension plate 2 and two capacitive plates 3a–b (alternatively, the device can have one capacitive plate), with a centrally located proof mass 8 supported by flexural elements 6 utilized in a known, prior-art micro-machined in-plane suspension geometry, as described and set forth in U.S. patent application Ser. No. 10/058,210.

As shown in FIG. 1, the proof mass 8 is centrally located and surrounded by a hollow cavity 4. The flexural elements 6 extend from opposite directions and allow the proof mass 8 to move in one direction, in the plane of suspension, but suppress motion of the proof mass in all other directions. These flexural elements 6 represent a significant improvement over the conventional use of a mechanical cantilevered spring design for supporting the proof mass.

The use of these flexural elements 6 allows for the production of a system having a resonance frequency of 10 Hz or less. However, it is desirable that this design be able to operate over a bandwidth of approximately 100 Hz (i.e. a bandwidth of 10× the resonant frequency). However, spurious resonant frequencies may exist over the bandwidth. These spurious resonant frequencies will have an adverse effect on the operation of the system. Accordingly, it is desirable to ensure that the spurious modes are suppressed and do not exist in the system.

There are known techniques for rejecting any signals that may result from off-axis spurious modes. One such technique adjusts the positioning of the drive and pick-up electrodes, such that the sensitivity to motion in the spurious mode is greatly attenuated by the design of the geometrical pattern of the electrodes. For example a symmetrical centered structure can show a very good rejection of a torsional motion. While this technique can allow for stable operation, it will still result in undesirable artifacts in the frequency and phase response of the system. Accordingly, an alternate approach for ensuring that other mechanical resonances do not exist within the desired bandwidth is needed.

As explained earlier, the suspension plate shown in FIG. 1 is ideally paired with at least one capacitive plate for use in a seismometer, an accelerometer, a velocimeter, or another similar device. In such a case, the capacitive plate is preferably configured to include pickup electrodes 10 and the proof mass is equipped with drive electrodes 11. This in-plane structure requires that the drive electrodes and the pickup electrodes be correspondingly spaced, with the same periodicity in order to ensure the accuracy of operation of the system. The periodicity of these electrodes affects the dynamic and static range of the system.

The out-of-plane sag of the proof mass must be accurately controlled in order to produce the proper geometry of the seismometer position transducer by ensuring accurate spacing between the drive and pickup electrodes. Unfortunately, the proof mass will suffer the normal effects of gravity and may experience an out of plane sag due to any cross-axis component of gravitational forces. Similarly, any off-axis accelerations can cause unwanted motion of the proof mass. The off-axis displacement is related to the in-plane displacement by the square of the ratio of the fundamental frequency divided by the frequency of the spurious out of plane mode. Accordingly, in order to minimize the out of plane sag, it is desirable to keep the ratio of these two frequencies as low as possible so that the spurious mode frequency is as high a multiple of the fundamental frequency as possible.

The present invention accomplishes the objectives of ensuring that other mechanical resonances do not exist within the desired bandwidth while minimizing out-of-plane sag by utilizing intermediate frames which are disbursed within the flexural elements in order to produce a system where the frequency of the first spurious mode is preferably at least ten times the resonant frequency of the system.

Figure 2:
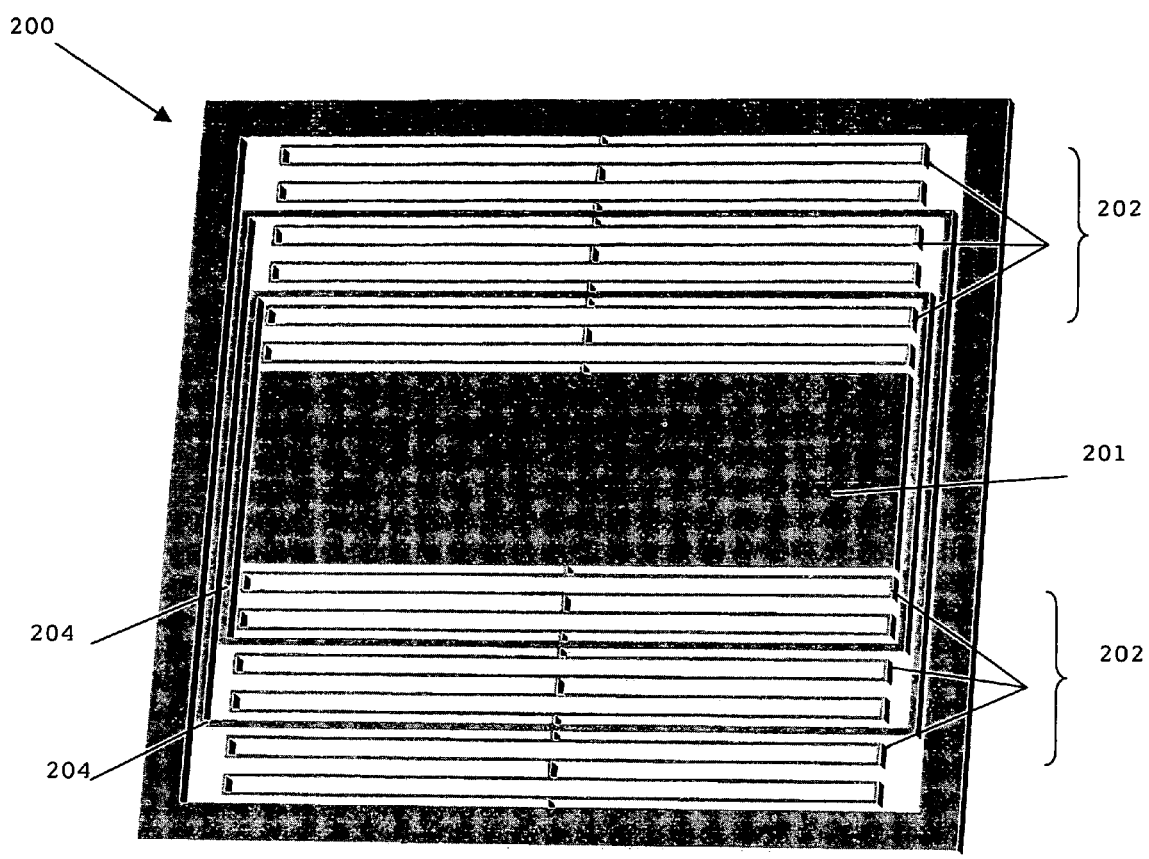
FIG. 2 illustrates a proof mass, flexural elements and intermediate frames as used in a preferred embodiment of a micro-machined in-plane suspension geometry.

FIG. 2 illustrates a suspension plate having a proof mass 201 supported by flexural elements 202 and further having intermediate frames 204 inter-disposed there between, in accordance with a first preferred embodiment of the present invention. Use of these intermediate frames 204 eliminates any spurious modes over a much larger bandwidth and allows the production of a device with a flat response over the region of such bandwidth. The intermediate frames 204 also provide additional support to the proof mass 201 and help reduce the out of plane sag.

As shown in FIG. 2, the intermediate frames 204 are integral to and are formed within the suspension plate 200 using the same micro-machining techniques used for forming the flexural elements 202. Accordingly, the implementation of these intermediate frames is easy to implement, without any effect on or additional complications to the design or fabrication of the system.

In a preferred embodiment, the present invention may utilize any number of intermediate frames, with the number of frames determined as a function of both the desired bandwidth over which spurious modes are to be eliminated and the desired operational parameters of the system. More particularly, as the number of intermediate frames is increased, a broader range of spurious resonant frequencies are eliminated, thus increasing the overall effective bandwidth over which the device may operate without the occurrence of any spurious resonant frequencies. However, as the number of intermediate frames is increased, the size of the proof mass is necessarily reduced in the limited space, thereby reducing the resonant frequency of the system. Further, the frames themselves introduce additional spurious sensitive-axis modes, whose frequency drops as the frame mass relative to the suspension mass increases. Accordingly, a desirable balance is struck between the desired elimination from the bandwidth of spurious out-of-plane and sensitive-axis modes.

The first step in selecting the optimum number of intermediate frames to utilize in any particular system is to select the fundamental operational frequency of the system. Having selected a fundamental operational frequency of the spring mass system a very desirable optimization is to move the spurious frequencies, either in axis or out of axis, to as high a frequency as possible in relation to the fundamental frequency of the spring mass system as this increases the useable bandwidth of the device. The in-axis first spurious mode decreases/deteriorates as the mass of each frame, $m_{frame}$, relative to mass of each set of flexural elements between the intermediate frames, $m_{flex}$, increases. The rejection ratio ($R_{massload}$) for this effect is given by the empirically derived equation:

$$R_{massload} = \frac{1}{1 + 0.124\,(m_{frame}/m_{flex})^{0.82}}$$

As the total number of intermediate frames is increased, $m_{frame}/m_{flex}$ becomes larger, as the suspension is further subdivided and $m_{flex}$ necessarily decreases. Hence the in-axis spurious frequency decreases as number of intermediate frames increases. The out-of-axis resonant frequency is given by $$\frac{f_{out}}{f_{in}} \propto \frac{1}{\sqrt{4n_{springs}^2 - 1}}$$

where $n_{springs}$ is the number of flexural element in each set of flexural elements between each intermediate frame. The constant of proportionality is almost completely independent of the number of frames. In this case, $n_{springs}$ falls as the number of intermediate frames increases (for a given total number of flexural elements), the out-of-axis spurious frequency increases as the number of frames increases. As our goal is the highest possible "spurious-free" frequency range we can optimize the number of frames to achieve this goal. Keeping all other parameters fixed, we can now plot the two effects for a particular case.

In a first preferred embodiment, we will assume we have a total of 6 flexural elements on each side of the proof mass in order to achieve a desired frequency response and for which we wish to determine the optimal or best number of frames for suppressing spurious frequencies given our desired operational frequency.

These 6 flexural elements can be divided into the following numbers of sets as follows:

| $n_{sets}$ | $n_{springs}$ | $n_{frames}$ |
|---|---|---|
| 1 | 6 | 0 |
| 2 | 3 | 1 |
| 3 | 2 | 2 |
| 6 | 1 | 5 |

For our case we can now plot the in-axis and out-of-axis frequencies in relation to the fundamental frequency, the so called "spurious-mode rejection ratio".

Figure 3:
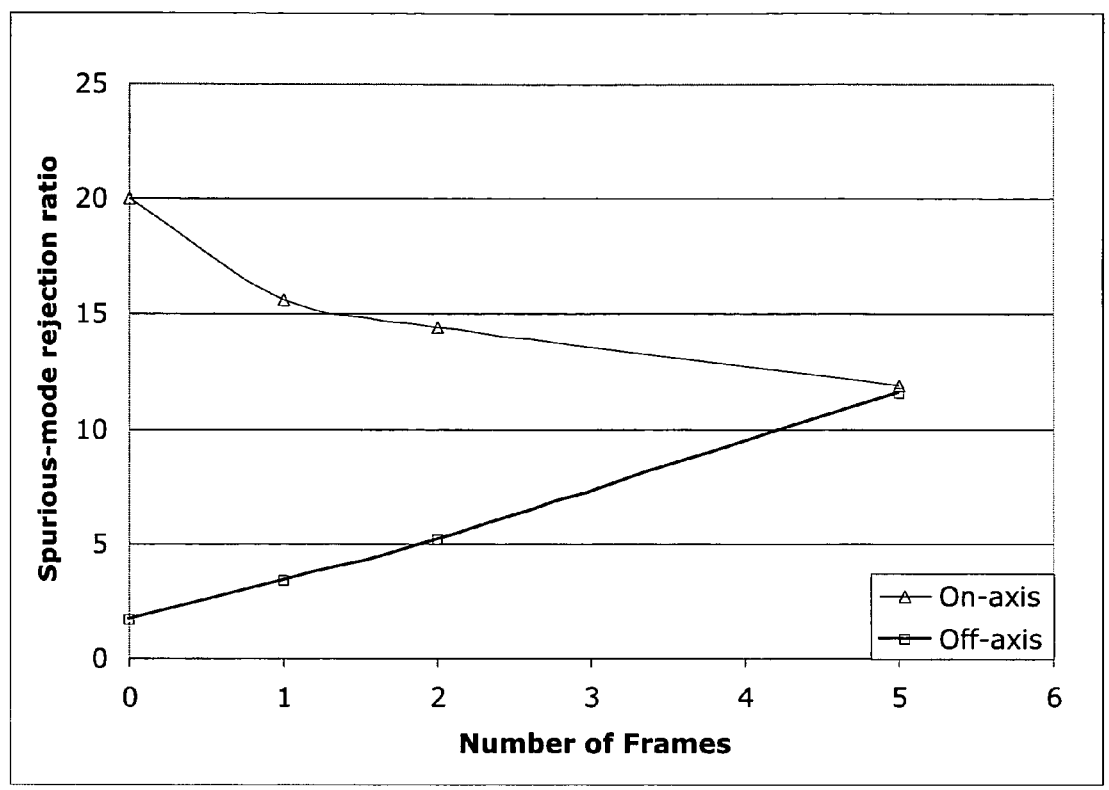
FIG. 3 illustrates the spurious mode rejection ratio for in-axis and out-of-axis modes as the number of intermediate frames is increased in a preferred embodiment having six flexural elements on each side of the proof mass.

FIG. 3 illustrates the spurious mode rejection ratio for in-axis and out of axis frequencies as the number of intermediate frames is increased. We can see from FIG. 3 that in order to maximize the rejection ratio for both in-axis and out of axis frequencies, the number of frames that should be incorporated into the design is 5, one between each of the 6 flexural elements. As the rejection ratio rises more steeply for the off-axis case than it falls for the on-axis case, there will be an overall tendency for more frames to produce better performance.

Figure 4:
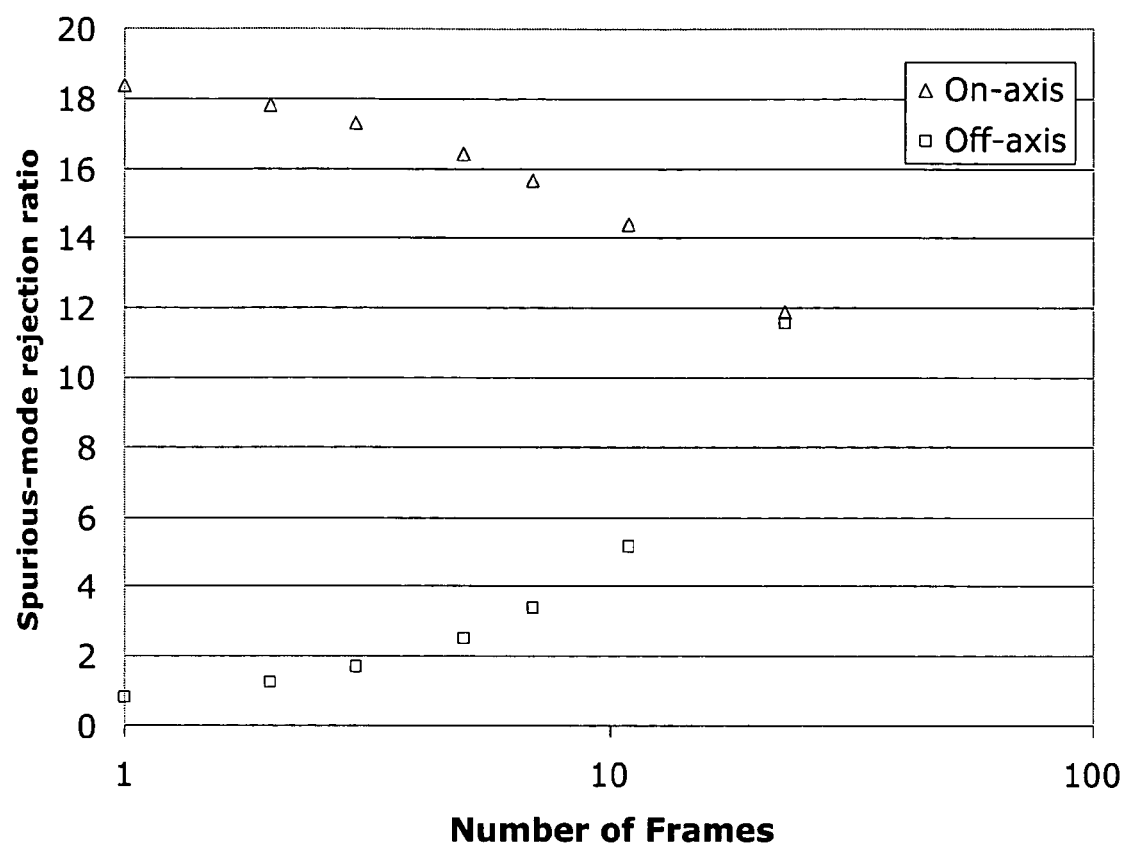
FIG. 4 illustrates the spurious mode rejection ratio for in-axis and out-of-axis modes as the number of intermediate frames is increased in a preferred embodiment having twenty four flexural elements on each side of the proof mass.

If we take an example with more flexural elements we can calculate more data points and see again the convergence of the "on-axis" and "off-axis" modes to give an improved overall rejection ratio. For example, in a second preferred embodiment let us assume we have 24 flexural elements in order to achieve a desired frequency response. For this case, let us again plot the in-axis and out-of-axis frequencies in relation to the fundamental frequency, the so called "spurious-mode rejection ratio". FIG. 4 illustrates the spurious mode rejection ratio for in-axis and out of axis frequencies as the number of intermediate frames is increased. We can see from FIG. 4 that in order to maximize the rejection ratio the maximum number of frames utilized in the design should be approximately 23, one between each intermediate frame should be incorporated into the design.

It is important to note that in some designs it may be desirable for other system considerations to not optimize for an equivalent spurious mode both for the in-axis and off-axis, but to allow say a lower off-axis spurious mode compared with the in-axis mode. This could be used for example when the off-axis is suppressed by the Displacement Transducer geometry, while the in-axis mode is not. The techniques presented can be used for any desired optimization.

Figure 5:
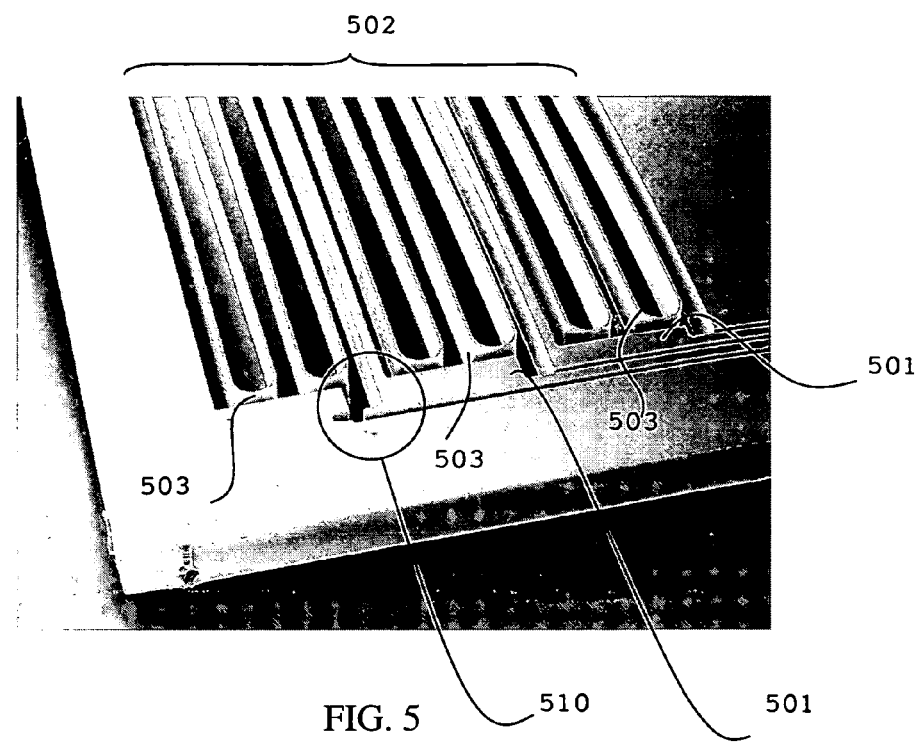
FIG. 5 illustrates a perspective view of a suspension plate 500 having a spring/gas dampening structure 510 in accordance with a preferred embodiment of the present invention.

The invention also preferably includes a dampening structure that is highly effective during non-powered/non-operational states (i.e. when the feedback control system is not powered and does not provide any dampening). Preferably, this dampening structure includes a spring/gas dampening structure configured to provide damping during non-powered states. FIG. 5 illustrates a perspective view of a suspension plate 500 having a spring/gas dampening structure 510 in accordance with a preferred embodiment of the present invention.

As shown in FIG. 5, each of the intermediate frames 501 is preferably larger (longer) in length then the flexural elements 503 disposed between each of the frames, with each frame traversing a larger portion of the internal cavity 502. The intermediate frames are also sufficiently rigid, but as light as possible, in order to suppress out of plane movement of the proof mass while also suppressing spurious resonant frequencies without breaking or fracturing. The intermediate frames 501 are designed to physically contact with each other before the flexural elements 503 interspersed between them are compressed sufficiently to cause damage to the flexural elements 503.

In order to prevent fracturing and/or damage due to extreme external shock or vibration, the invention preferably further includes the specially formed spring/gas dampening structure 510, which provides additional damping to the system during non-powered states.

Figure 6:
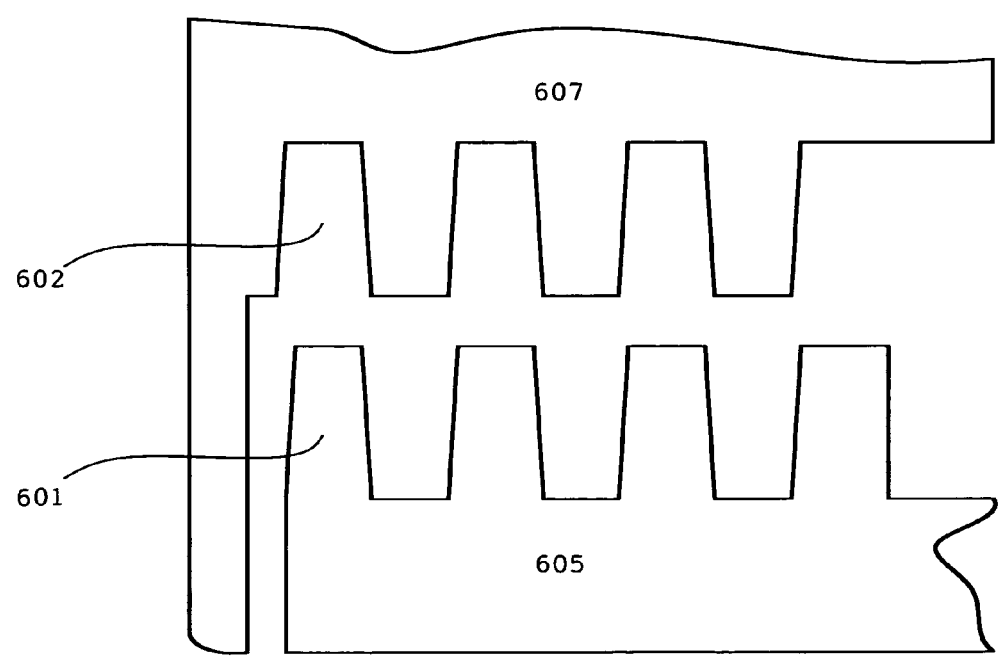
FIG. 6 illustrates a close-up view of a preferred embodiment of the spring/gas dampening structure.

Turning to FIG. 6, there is shown a close-up view of a preferred embodiment of the spring/gas dampening structure 510. As shown, the preferred embodiment preferably includes one or more trapezoidal shaped pistons 601 and engagement apertures 602. In a preferred embodiment, a piston 601 is preferably positioned on the last (most outward) intermediate frame 605, facing outward, and the corresponding engagement aperture 602 is then positioned on the inner surface of outer frame of the suspension plate 607, facing inward. As the most outward intermediate frame 605 approaches the inner surface of the outer frame of the suspension plate 607, the piston 601 will engage and insert into the aperture 602, thereby providing a dampening effect before the intermediate frame can contact the surface of the outer frame of the suspension plate.

In a preferred embodiment, the cavity of the suspension plate is preferably filled with a non-conductive gas such as air or nitrogen. As the outermost intermediate frame 605 moves toward the inner surface of the outer frame of the suspension plate 607, the piston 601 engages with and inserts into the engagement aperture 602. As the piston recedes further into the aperture, the gas within the engagement aperture increases in pressure, causing a force to be exerted against the piston and slowing the motion of the intermediate frame until, possibly over multiple oscillations of the spring mass system, it comes to rest, thereby preventing damage to the flexural elements.

Figure 7:
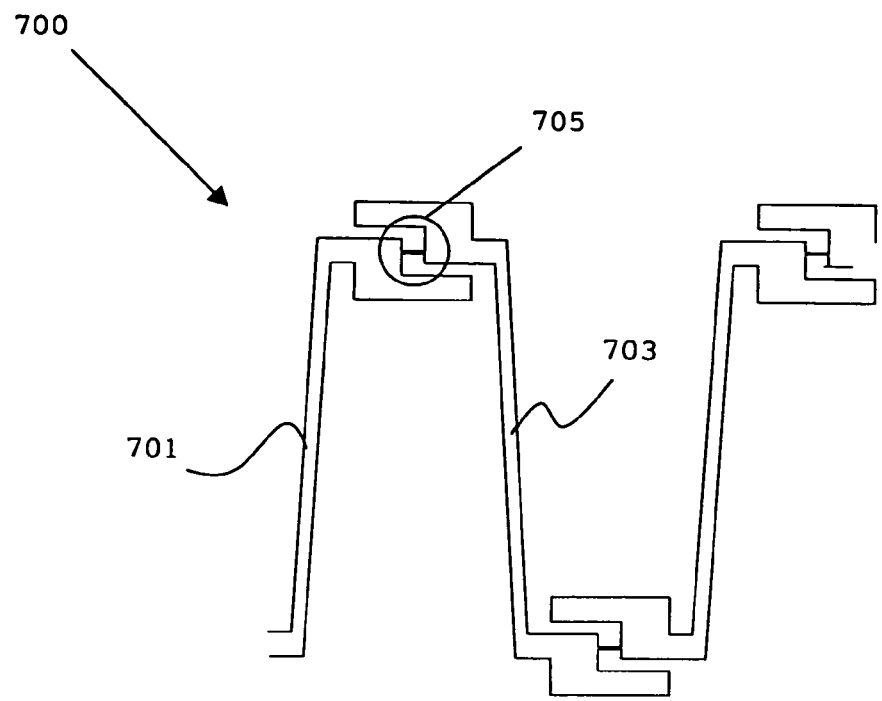
FIG. 7 illustrates a close-up view of a piston used in an alternative embodiment of the spring/gas damping structure.
Figure 8:
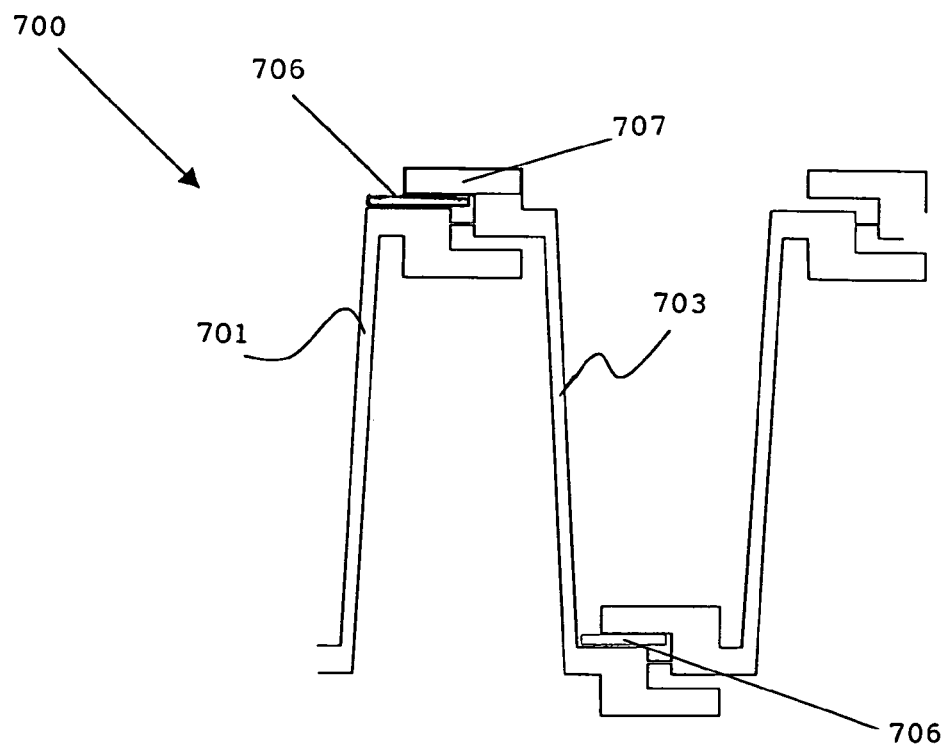
FIG. 8 illustrates an another close-up view of an alternative piston used in an alternative embodiment of the spring/gas damping structure.

Alternatively, the cavity within the suspension plate may be evacuated. In this case, the spring/gas dampening structure is preferably comprised of a aperture and a corresponding piston wherein the piston is actually formed of two separate portions coupled together using a small resistance spring. FIG. 7 is a close-up view of such an alternative embodiment of a piston 700 used in a spring/gas damping structure, wherein the piston is formed of two separate portions coupled together using a small resistance spring. As shown, the piston includes a first half portion 701 and a second half portion 703, which are coupled together using a small resistance springs 705. In normal operation when the pistons are not engaged these two spring elements are separate, but as the parts contact they form a spring element. As the piston 700 inserts further into the aperture of the spring/gas dampening structure, second half portion 703 of the piston is pushed against and closer to the first half portion 701 while the resistance spring provides a force against the second half portion 703. As the second half portion 703 moves closer to the first half portion 701, the resistance from the spring increases. This spring motion can be used both to dissipate energy, but also to act as an energy store to disengage the first and second half portions to prevent them "sticking" together by the force of stiction and preventing the device from functioning as a spring mass system. Alternatively, a layer of damping material such as a visco-elastic polymer 706 may be inserted between the first half portion 701 and the second half portion 703, in place of or in addition to the resistance spring, as shown in FIG. 8. A visco-elastic material block 707 can also be deposited on top of the spring element 705 to provide damping and energy loss in the spring.

For practical production of a seismometer device having a suspension plate and two conductive or capacitive plates, as described in U.S. patent application Ser. No. 10/058,210, it is highly desirable that a single device geometry can be used to produce all three components of the sensor—i.e. the capacitive plates and the suspension plate. In order to accomplish this, all three plates are preferably arranged in a "Galperin" orientation so each sees the same gravity vector. Due to the geometry of the device it is important to ensure for optimal operation and design that when exposed to this gravity vector the proof mass is centered. If the suspension plate it manufactured separate from the capacitive plates, then the gravity force on the proof mass will effect the centering of the proof mass relative to each of the other capacitive plates and this will affect the readings as to each plate when the whole device is formed.

Figure 9:
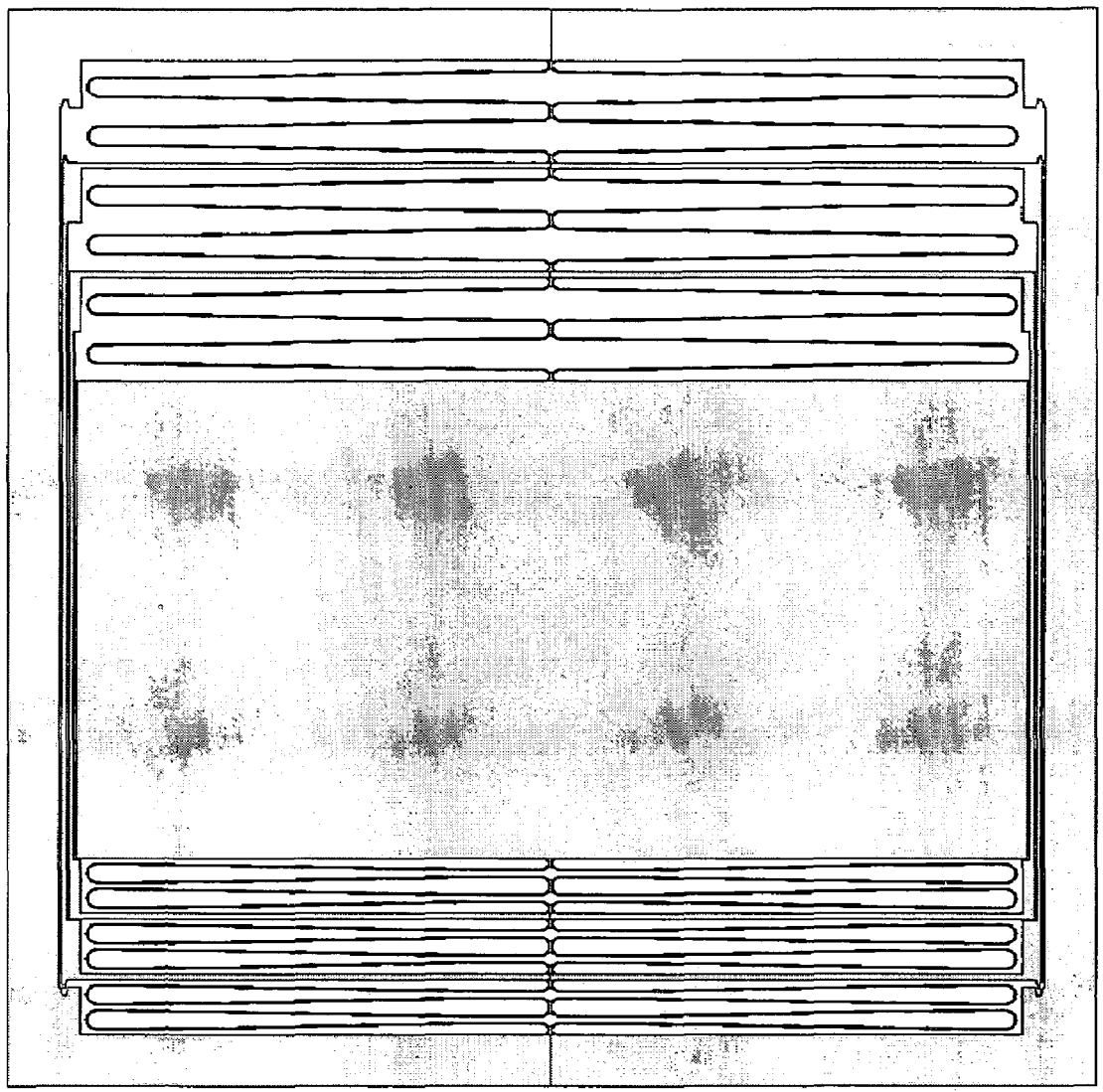
FIG. 9 illustrates a mask set that has been deliberately biased so that the flexural elements are "pre-tensioned" when lying flat.

To ensure that the proof mass is centered after production, the mask set is deliberately biased so that the flexural elements are "pre-tensioned" when lying flat. This pre-tensioning is such that when orientated at the "Galperin" orientation, or angle of 54.7 degrees, the spring mass system is centered. When the material is removed by a method such as Deep Reactive Ion Etching (DRIE) the spring assumes a centered position at the Galperin angle of 54.7 degrees. The pre-tensioning can be calculated either analytically or using Finite Element Analysis, both techniques are well know to those skilled in the art, such that the pattern is the same deflection pattern that would be observed in a released symmetrical structure when subject to an acceleration of opposite magnitude and direction to that the system when orientated at the Galperin position. This level of pre-tensioning will then almost exactly counterbalance the gravity vector in the Galperin orientation so that the mass will be nearly perfectly centered. FIG. 9 illustrates a mask set that has been deliberately biased so that the flexural elements are "pre-tensioned" when lying flat.

Finally, for optimum performance, the center of mass of the proof mass and the center of action of the actuator should be collocated. In addition the direction of motion of the proof mass and the direction of force of the actuator should be collinear. The device can be produced with a displacement transducer and magnetic actuator both formed on a single surface of the device. This minimizes processing cost, but allows development of off-axis forces and responses. There are two methods for producing the desired geometry and a further method for compensating for any residual off-axis effects. For the first method, the magnetic actuator is fabricated on both sides of the device. In this design the off-axis torque tends to balance out, at the cost of a considerably more complex fabrication process. For the second method, the actuator and transducer are fabricated on different sides of the proof mass and a duplicate of the suspension (frame, spring and proof mass) is bonded on the actuator side of the proof mass. This composite proof mass has an actuator at its center of mass, again at the cost of a considerably more complex fabrication process.

While the description above refers to particular embodiments of the present invention, it will be understood that many modifications may be made without departing from the spirit thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced herein.

What is claimed is:

1. A seismometer comprising:
   at least one fixed capacitive plate;
   a first capacitive sensor array positioned on a surface of said fixed capacitive plate, said first capacitive sensor array having a periodic pattern of conductive elements;
   a suspension plate having a proof mass supported by a plurality of flexural elements capable of constraining motion of said proof mass to a single axis with at least one intermediate frame positioned within and between said flexural elements, said intermediate frame eliminating spurious frequencies and providing a wider effective operational bandwidth of said seismometer;
   a second capacitive sensor array positioned on a surface of said proof mass having a periodic pattern of conductive elements aligned in a common direction of periodicity parallel to said conductive elements in said first capacitive sensor array in separated opposition;
   an electrical connection to said first capacitive sensor array on said fixed plate allowing a coupling of cyclic excitations from external components through said periodic pattern of said first capacitive sensor array to said periodic pattern of said second capacitive sensor array, said coupling ranging between zero and one hundred percent and being a cycling positional measure of said proof mass with respect to said fixed plate;
   an electrical connection to said second capacitive sensor array on said proof mass transmitting a signal resulting from said coupling of said first capacitive sensor to said second capacitive sensor array to external electronics, said external electronics determining the percentage of said coupling between the first capacitive sensor array and the second capacitive sensor array in order to transduce the position of said proof mass relative to said fixed plate.

2. The seismometer of claim 1, wherein the suspension plate further includes a spring/gas dampening structure having:
   a trapezoidal shaped piston positioned on the outermost intermediate frame; and
   a corresponding engagement aperture positioned on an inner surface of the suspension plate such that as the outermost intermediate frame approaches the inner surface of the suspension plate, said trapezoidal shaped piston will engage and insert into said engagement aperture, thereby providing a dampening effect before said outermost intermediate frame can contact said inner surface of the suspension plate.

3. The seismometer of claim 2, wherein the piston includes:
   a first half portion; and
   a second half portion, coupled to the first half portion using a small resistance spring such that as the piston inserts further into the aperture of the spring/gas dampening structure, the second half portion of the piston is pushed against and closer to the first half portion while the resistance spring provides a force against the second half portion.

4. The seismometer of claim 2, wherein the piston includes:
   a first half portion;
   a second half portion; and
   a damping material inserted between the first half portion and the second half portion such that as the piston inserts further into the aperture of the spring/gas dampening structure, the second half portion of the piston is pushed against and closer to the first half portion while the damping material provides a resistive and dissipative force against the second half portion.

5. A suspension plate micro-machined to form a central proof mass and flexural elements located on opposite sides of said proof mass, said flexural elements allowing the proof mass to move in one direction, in the plane of suspension, but suppressing motion in all other directions, said suspension plate further micro-machined to include at least one intermediate frame positioned within the flexural elements in order to produce a system where the frequency of a first spurious mode is at least ten times the resonant frequency of the system.

6. The suspension plate of claim 5, further comprising:
   a spring/gas dampening stricture having;
   a trapezoidal shaped piston positioned on the outermost intermediate frame; and
   a corresponding engagement aperture positioned on an inner surface of the suspension plate such tat as the outermost intermediate frame approaches the inner surface of the suspension plate, said trapezoidal shaped piston will engage and insert into said engagement aperture, thereby providing a dampening effect before said outermost intermediate frame can contact said inner surface of the suspension plate.

7. The suspension plate of claim 6, wherein the piston of the spring/gas dampening structure includes:
 a first half portion; and
 a second half portion, coupled to the first half portion using a small resistance spring such that as the piston inserts further into the aperture of the spring/gas dampening structure, the second half portion of the piston is pushed against and closer to the first half portion while the resistance spring provides a force against the second half portion.

8. The suspension plate of claim 6, wherein the piston includes
 a first half portion;
 a second half portion; and
 a damping material inserted between the first half portion and the second half portion such that as the piston inserts further into the aperture of the spring/gas dampening structure, the second half portion of the piston is pushed against and closer to the first, half portion while the damping material provides a resistive force against the second half portion.

9. An accelerometer comprising:
 a suspension plate micro-machined to form a central proof mass and flexural elements located on opposite sides of said proof mass, said flexural elements allowing the proof mass to move in one direction, in the plane of suspension, but suppressing motion in all other directions, said suspension plate further micro-machined to include at least one intermediate frame positioned within the flexural elements;
 a transducer for determining the position of the proof mass relative to a fixed plate by determining a coupling capacitance between a first capacitive sensor array on a surface of said fixed plate and a second capacitive sensor array on a surface of said proof mass, an actuator for generating and emitting an actuation signal in order to move said proof mass;
 feedback electronics for using said proof mass position as determined by said transducer in order to produce a feedback signal in order to control said actuator, thereby managing the actuation signal and controlling the motion of said proof mass within desired parameters; and
 a means for measuring the actuation signal and determining an acceleration component of the movement of the proof mass as a function thereof.

10. The accelerometer of claim 9, wherein the feedback signal controls the actuator in order to maintain said proof mass in approximately a null position within one cycle of said transducer.

11. The accelerometer of claim 9, further comprising a velocity sensor comprising a means for determining a velocity component for the movement of said proof mass by measuring a voltage within said feedback electronics and calculating the velocity component as a function of such measurement.

12. The accelerometer of claim 9, further comprising:
 limit control electronics for receiving said actuation signal generated by the actuator and temporarily zeroing said actuation signal if said actuation signal exceeds a preset limit corresponding to movement of said proof mass of a distance substantially more than one half a repeat distance of said transducer.

13. The accelerometer of claim 9, wherein the actuator is an electrostatic actuator.

14. The accelerometer of claim 13, wherein the electrostatic actuator includes a set of actuator plates, one positioned on the fixed plate and one on the proof mass, said plates arranged to receive the actuation signal and generate a force sufficient to move the proof mass.

15. The accelerometer of claim 14, wherein the force generated as a linear function of said actuation signal.

16. The accelerometer of claim 9, wherein the actuator is an electromagnetic actuator.

17. The accelerometer of claim 16, wherein the electromagnetic actuator includes:
 a fixed eternal magnetic circuit having two magnet sets on each side of the proof mass;
 a main feedback coil and an integrator feedback coil on said proof mass;
 external feedback circuitry using said proof mass position determined from said transducer, said feedback circuitry providing separate feedback currents to said main feedback coil and said integrator feedback coil in order to stimulate electro-magnetic interactions between the two coils and the magnets, thereby controlling the movement and position of the proof mass, said main feedback coil and said integrator feedback coil milling velocity input signals and position input signals to said transducer; and
 limit control electronics for temporarily zeroing said feedback currents provided to said integrator feedback coil when said currents exceed a preset limit corresponding to movement by the proof mass, in either direction, of a distance greater than one half of a repeat distance of said transducer.

18. The accelerometer of claim 17, wherein said proof mass is comprised of two wafers bonded together and said integrator feedback coil is located centrally between said two wafers to provide symmetric actuation.

19. The accelerometer of claim 17, wherein said external feedback circuitry drives said main feedback coil and said integrator feedback coil in a transconductance configuration.

20. A transducer comprising:
 at least one fixed capacitive plate;
 a first capacitive sensor array on a surface of said fixed plate, said first capacitive sensor array having a periodic pattern of conductive elements;
 a suspension plate with a proof mass supported by a plurality of flexural elements capable of constraining motion of said proof mass to a single axis, said plurality of flexural elements engaging a plurality of frames;
 a second capacitive sensor array on a surface of said proof mass, said second capacitive sensor array comprising a periodic pattern of conductive elements of equal periodicity to said first capacitive sensor array, said first and second capacitive sensor arrays being parallel to the motion of the proof mass, said sensor arrays having a common direction of periodicity in separated opposition;
 an electrical connection to said first capacitive sensor array on said fixed plate allowing a coupling of cyclic excitations from external electronics through said periodic pattern of said first capacitive sensor array to said periodic pattern of said second capacitive sensor array, said coupling ranging between zero and one hundred percent and being a cycling positional measure of said proof mass with respect to said fixed plate;
 an electrical connection to second capacitive sensor array on said proof mass transmitting a signal resulting from said coupling of said first capacitive sensor array to said second capacitive sensor array to external electronics for determination of percentage of said coupling between the first capacitive sensor ray and the second capacitive sensor array in order to transduce the position of said proof mass relative to said fixed plate.

21. An accelerometer comprising;
a suspension plate micro-machined to form a central proof mass and flexural elements located on the opposite sides of said proof mass, said flexural elements engaged with a plurality of frames and allowing the proof mass to move along a single axis in the plane of said suspension plate;
a transducer for determining the position of a proof mass relative to a fixed plate by determining a coupling capacitance between a first capacitive sensor array on a surface of said fixed plate and a second capacitive sensor array on a surface of said proof mass,
an actuator for generating and emitting an actuation signal in order to move said proof mass;
feedback electronics for using said proof mass position as determined by said transducer in order to produce a feedback signal in order to control said actuator, thereby managing the actuation signal and controlling the motion of said proof mass within desired parameters; and
a means for measuring the actuation signal and determining an acceleration component of the movement of the proof mass as a function thereof.

22. The accelerometer of claim 21, wherein the feedback signal controls the actuator in order to maintain said proof mass in approximately a null position within one cycle of said transducer.

23. The accelerometer of claim 21, further comprising:
a velocity sensor having a means for determining a velocity component for the movement of said proof mass by measuring a voltage within said feedback electronics and calculating the velocity component as a function of such measurement.

24. The accelerometer of claim 21, further comprising:
limit control electronics for receiving said actuation signal generated by the actuator and temporarily zeroing said actuation signal if said actuation signal exceeds a preset limit corresponding to movement of said proof mass of a distance substantially more than one half a repeat distance of said transducer.

25. The accelerometer of claim 21 wherein the flexural elements allow in plane movement in two axes, said in plane movement detected by a second set of separate sensor arrays aligned in periodicity to said two axes.

26. The accelerometer of claim 21, wherein the actuator is an electrostatic actuator.

27. The accelerometer of claim 26, wherein the electrostatic actuator includes a set of actuator plates, one positioned on the fixed plate and one on the proof mass, said plates arranged to receive the actuation signal and generate a force sufficient to move the proof mass.

28. The accelerometer of claim 27, wherein the force generated as a linear function of said actuation signal.

29. The accelerometer of claim 21, wherein the actuator is an electromagnetic actuator.

30. The accelerometer of claim 29 wherein the electromagnetic actuator includes:
a fixed external magnetic circuit having two magnet sets on each side of the proof mass;
main feedback coil and an integrator feedback coil on said proof mass;
external feedback circuitry using said proof mass position determined from said transducer, said feedback circuitry providing separate feedback currents to said main feedback coil and said integrator feedback coil in order to stimulate electro-magnetic interactions between the two coils and the magnets, thereby controlling the movement and position of the proof mass, said main feedback coil and said integrator feedback coil nulling velocity input signals and position input signals to said transducer; and
limit control electronics for temporarily zeroing said feedback currents provided to said integrator feedback coil when said currents exceed a preset limit corresponding to movement by the proof mass, in either direction, of a distance greater than one half of a repeat distance of said transducer.

31. The accelerometer of claim 30 wherein said proof mass is comprised of two wafers bonded together and said integrator feedback coil is located centrally between said two wafers to provide symmetric actuation.

32. The accelerometer of claim 30 wherein said eternal feedback circuitry drives said main feedback coil and said integrator feedback coil in a transconductance configuration.

33. The accelerometer of claim 26 having an additional electrostatic actuator to provide a calibration input.

34. The accelerometer of claim 29 having an additional electromagnetic actuator to provide a calibration input.

* * * * *